(12) United States Patent  (10) Patent No.: US 7,719,153 B2
Hsu  (45) Date of Patent: May 18, 2010

(54) PERMANENT MAGNET MACHINE AND METHOD WITH RELUCTANCE POLES AND NON-IDENTICAL PM POLES FOR HIGH DENSITY OPERATION

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 176 days.

(21) Appl. No.: 11/642,232

(22) Filed: Dec. 20, 2006

(65) Prior Publication Data

US 2007/0145850 A1  Jun. 28, 2007

Related U.S. Application Data

(60) Provisional application No. 60/752,695, filed on Dec. 21, 2005, provisional application No. 60/806,968, filed on Jul. 11, 2006.

(51) Int. Cl.
H02K 1/27 (2006.01)
(52) U.S. Cl. .................... 310/156.58; 310/156.53; 310/156.56; 310/156.57
(58) Field of Classification Search ................ 310/156.56–156.61, 190, 191, 181, 43, 53, 310/216, 156.54
See application file for complete search history.

(56) References Cited

U.S. PATENT DOCUMENTS

| | | | |
|---|---|---|---|
| 3,411,027 A | | 11/1968 | Rosenberg et al. |
| 6,147,428 A | * | 11/2000 | Takezawa et al. ...... 310/156.57 |
| 6,177,745 B1 | * | 1/2001 | Narita et al. ........... 310/156.43 |
| 6,441,525 B1 | | 8/2002 | Koharagi et al. |
| 6,967,424 B2 | * | 11/2005 | Popov ........................ 310/216 |
| 6,972,504 B1 | | 12/2005 | Hsu |
| 6,989,619 B2 | * | 1/2006 | Hsu ....................... 310/156.56 |

(Continued)

FOREIGN PATENT DOCUMENTS

JP  2000-288835  *  8/2000

OTHER PUBLICATIONS

Koichiro Muta, Makota Yamazaki and Junji Tokieda, Toyota Motor Corp., "Development of New-Generation Hybrid System THS II-Drastic Improvement of Power Performance and Fuel Economy", No. 2004-01-0064, ISBN 0-7680-1319-A, Copyright 2004 SAE International.

*Primary Examiner*—Karl I Tamai
(74) *Attorney, Agent, or Firm*—Boyle Fredrickson, S.C.

(57) ABSTRACT

A method and apparatus in which a stator (11) and a rotor (12) define a primary air gap (20) for receiving AC flux and at least one source (23, 40), and preferably two sources (23, 24, 40) of DC excitation are positioned for inducing DC flux at opposite ends of the rotor (12). Portions of PM material (17, 17a) are provided as boundaries separating PM rotor pole portions from each other and from reluctance poles. The PM poles (18) and the reluctance poles (19) can be formed with poles of one polarity having enlarged flux paths in relation to flux paths for pole portions of an opposite polarity, the enlarged flux paths communicating with a core of the rotor (12) so as to increase reluctance torque produced by the electric machine. Reluctance torque is increased by providing asymmetrical pole faces. The DC excitation can also use asymmetric poles and asymmetric excitation sources. Several embodiments are disclosed with additional variations.

16 Claims, 17 Drawing Sheets

U.S. PATENT DOCUMENTS

| | | | |
|---|---|---|---|
| 7,129,611 B2* | 10/2006 | Hsu | 310/156.56 |
| 7,518,278 B2* | 4/2009 | Hsu | 310/156.56 |
| 2004/0007930 A1* | 1/2004 | Asai et al. | 310/156.53 |
| 2004/0232794 A1* | 11/2004 | Hsu | 310/156.56 |
| 2005/0200223 A1 | 9/2005 | Tajima et al. | |
| 2007/0145850 A1* | 6/2007 | Hsu | 310/156.56 |

* cited by examiner

PERMANENT MAGNET MACHINE AND METHOD WITH RELUCTANCE POLES AND NON-IDENTICAL PM POLES FOR HIGH DENSITY OPERATION

CROSS-REFERENCE TO RELATED APPLICATION

The benefit of priority based on U.S. Provisional Patent Application No. 60/752,695, filed Dec. 21, 2005, is claimed herein. The benefit of priority based on U.S. Provisional Patent Application No. 60/806,968, filed Jul. 11, 2006, is also claimed herein. The disclosure of these documents is incorporated herein by reference.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including induction machines, permanent magnet (PM) machines and switched reluctance machines.

DESCRIPTION OF THE BACKGROUND ART

There are three major types of brushless electric machines available for the electric vehicle (HV) and hybrid electric vehicle (HEV) drive systems. These are the induction machine, the PM machine, and the switched-reluctance machine.

Permanent magnet (PM) machines have been recognized for having a high power density characteristic. A PM rotor does not generate copper losses. One drawback of the PM motor for the above-mentioned application is that the air gap flux produced by the PM rotor is limited, and therefore, a sophisticated approach is required for high speed, field weakening operation. Another constraint is that inductance is low, which means that current ripple must be controlled.

It is understood by those skilled in the art that a PM electric machine has the property of high efficiency and high power density, however, the air gap flux density of a PM machine is limited by the PM material, which is normally about 0.8 Teslas and below. A PM machine cannot operate at an air gap flux density as high as that of a switched reluctance machine. When the PM motor needs a weaker field with a reasonably good current waveform for high-speed operation, a sophisticated power electronics inverter is required.

Rosenberg et al., U.S. Pat. No. 3,411,027, illustrates a permanent magnet (PM) machine with field excitation. There is no intent to shield the flux path for the field induced flux to prevent flux leakage. Therefore, significant flux leakage would occur resulting in a reduction of power density. In addition, Rosenberg et al. does not teach any additional reluctance poles or reluctance flux paths for producing reluctance torque in such a PM motor.

Koharagi et al. U.S. Pat. No. 6,441,525, discloses permanent magnet (PM) barriers arranged in a V-shape and a U-shape. This patent also teaches the additional reluctance flux paths of a rotor, but without using a shunt field excitation.

It is known in the art that the reluctance torque is produced by the difference between the d-axis inductance, $L_d$, and the q-axis inductance, $L_q$. As this difference increases, the reluctance torque increases. The flux passing through the d-axis poles in Koharagi is concentrated, but is also reduced, by the V-shaped and U-shaped PM barriers. This means that the q-axis inductance, $L_q$, produces a flux having a less restrictive flux path to pass through along the q-axis, compared with the flux produced by the d-axis inductance, $L_d$. The above d-axis and q-axis flux paths are restricted to two dimensions and without the additional excitation flux paths disclosed herein.

Tajima et al., U.S. Patent Pub. No. U.S. 2005/0200223 utilizes PMs arranged in a V-shape to reduce the core loss under certain operating conditions. There are several drawbacks with this approach. Because the back emf produced by the strong PMs is proportional to the speed, a boost converter is needed to raise the voltage fed to the motor at high speed. The core loss at high speed is also high, due to the strong PMs, and this is true even when the motor is disconnected from the power supply. This publication does not disclose the use of field excitation to improve performance.

Tajima also discloses symmetrical concavities per pole formed on the air gap face of the magnetic pole pieces of the rotor iron core. These are provided for the purpose of reducing core losses otherwise inherent in the design.

Hsu, U.S. Pat. No. 6,972,504, issued Dec. 6, 2005, discloses a PM machine with reluctance poles and DC excitation coils positioned at opposite ends of the rotor. Prior designs have been largely symmetrical in their configuration of the PM poles and reluctance poles.

The present invention is intended to improve reluctance torque and power density in a PM machine, while still providing a compact configuration.

SUMMARY OF THE INVENTION

This invention provides a high density PM machine in which reluctance poles are added to permanent magnets (PM's) in a machine rotor to allow enhanced field control. The PM pole portions of one polarity provide enlarged flux paths in relation to flux paths for pole portions of an opposite polarity, with the enlarged flux paths communicating with a core of the rotor so as to increase torque produced by the electric machine.

In another embodiment, the reluctance poles can be provided with asymmetric pole faces.

In another embodiment, DC excitation is provided by asymmetric PMs disposed at the ends of the rotor making it unnecessary to use the stationary DC excitation coil assemblies. The PM elements rotate with the rotor.

The invention provides increased power and torque without increasing the size of the machine.

The invention is applicable to both AC synchronous machines and DC brushless machines, and to both motors and generators.

The invention is provides a compact electric machine structure for application to electric or hybrid vehicles.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1:
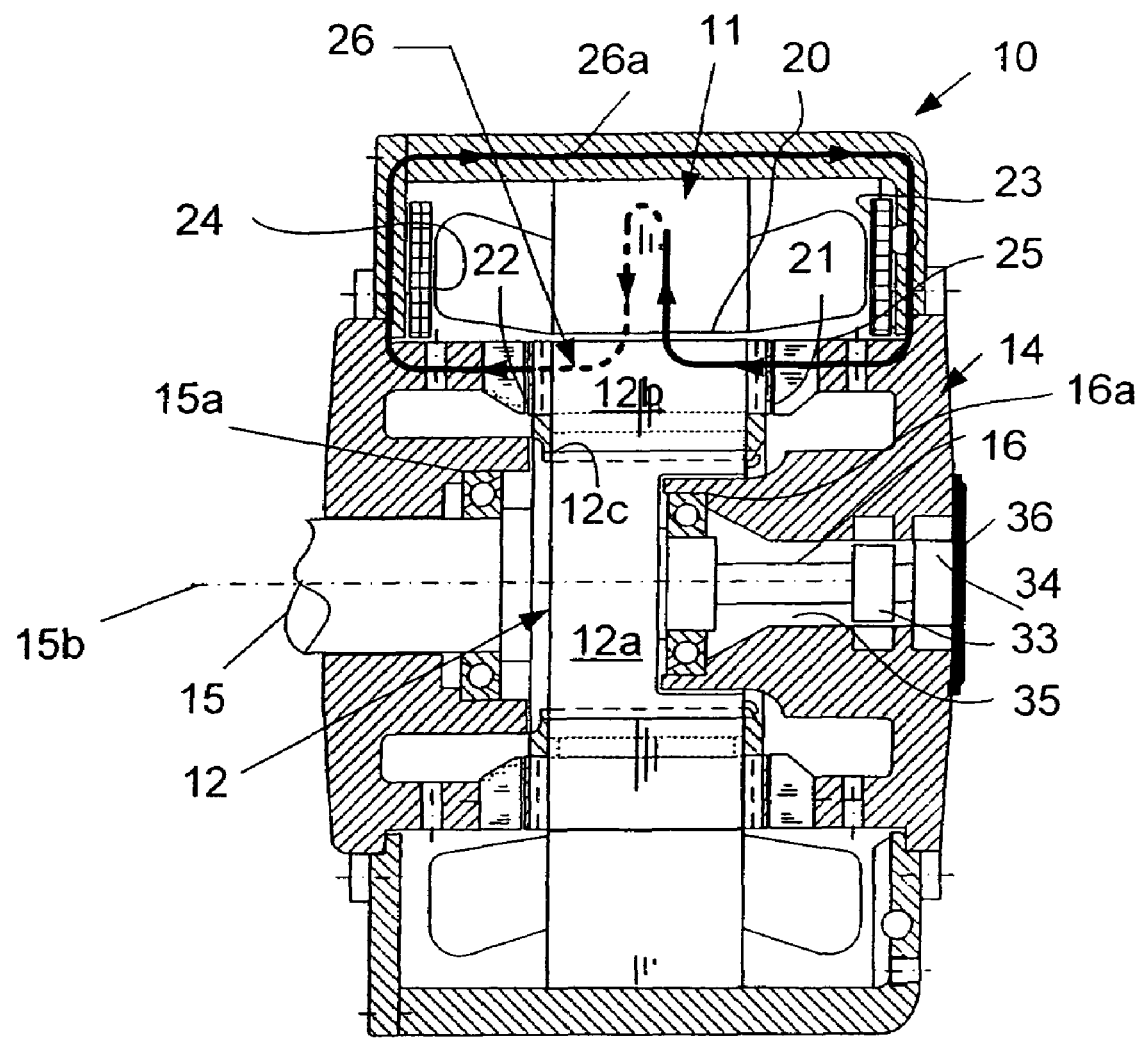
FIG. 1 is a longitudinal section view of a brushless PM machine with reluctance poles.

FIG. 1 shows a longitudinal section view of a radial gap PM machine 10 of the present invention having a ring-shaped stator 11 mounted in a housing assembly 14. The stator has a plurality of stator coils arranged in a manner which is known in the art to produce an AC flux in a radial air gap 20 disposed between the stator 11 and a rotor 12. The rotor 12 is mounted for rotation with a primary drive shaft 15 and a short internal drive shaft 16 that are in turn mounted on bearings 15a, 16a in the housing assembly 14. A shaft encoder 33 and a pump 34 for lubricant for the motor 10 are situated inside a passageway 35 in which in internal shaft 16 is positioned. A housing cover 36 closes the passageway 33.

The rotor 12 is an assembly that has a hub 12a with a plurality of laminations 12b of ferromagnetic material stacked on the hub, keyed to the hub at location 12c and clamped by non-magnetic metal end pieces 12d as further described in U.S. Pat. No. 6,972,504, cited above. The stacked laminations reduce the occurrence of eddy currents resulting from the flux which travels through in an axial direction through the rotor assembly 12.

Figure 1A:
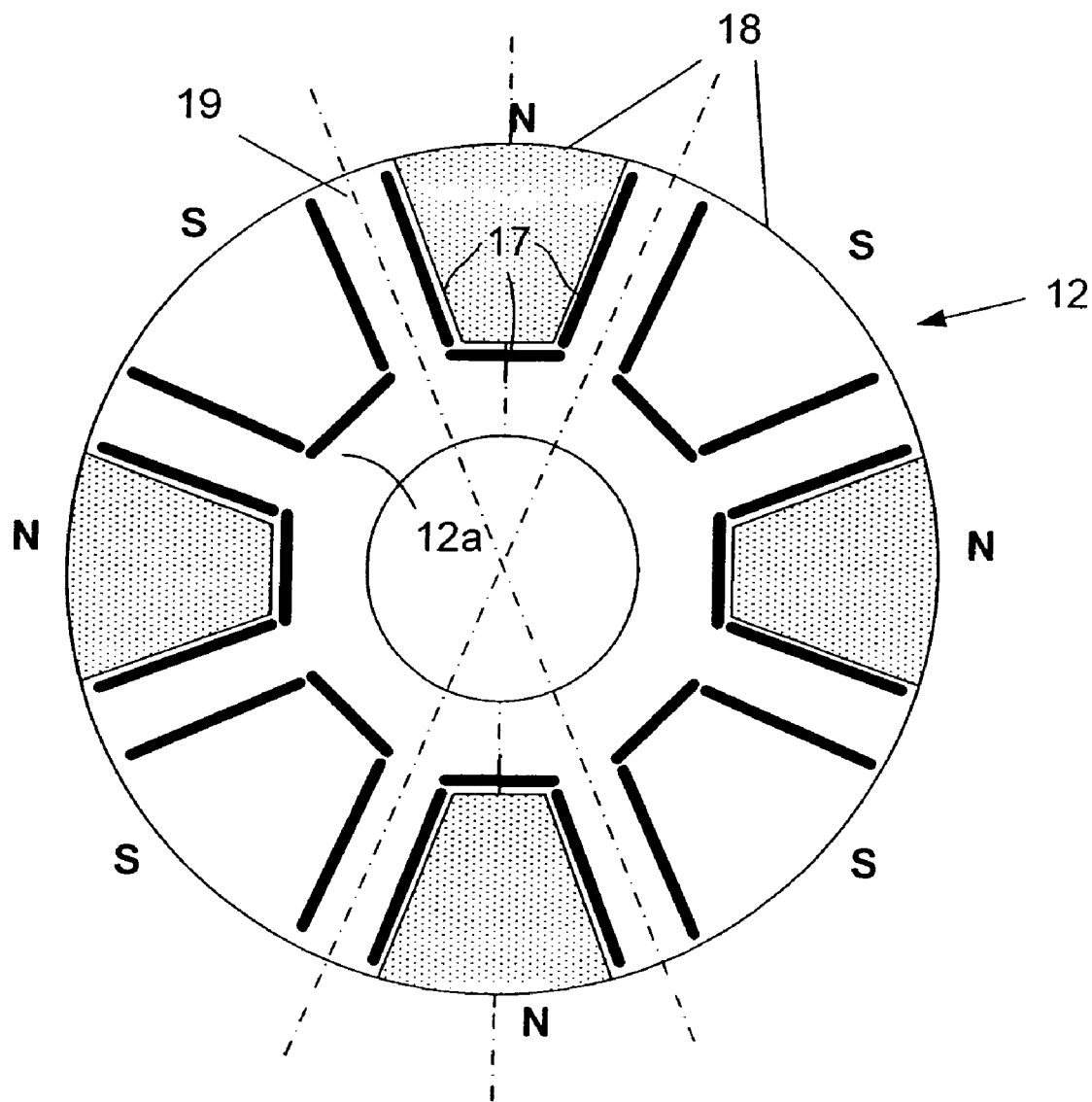
FIG. 1a is a transverse sectional view of a rotor assembly seen in FIG. 1.

Referring to FIG. 1a, PM pole pieces 18 as described in U.S. Pat. No. 6,972,504, cited above, are disposed in longitudinal grooves and retain the PM magnetic elements 17 in place in still deeper grooves with the assistance of adhesives. The PM magnetic elements 17 can be pre-formed pieces or the injected type. Between pieces of PM material 17, an epoxy material can be used to fill gaps. PM end pieces (not shown) are separate pieces attached to the ends of the rotor assembly 12 to hold the PM pole pieces 18 and magnets 17 in position. The PM material separates the north (N) PM poles and south (S) south PM poles 18 from the rotor hub 12a and from reluctance poles 19 disposed between the north (N) PM poles and south (S) south PM poles.

Figure 5:
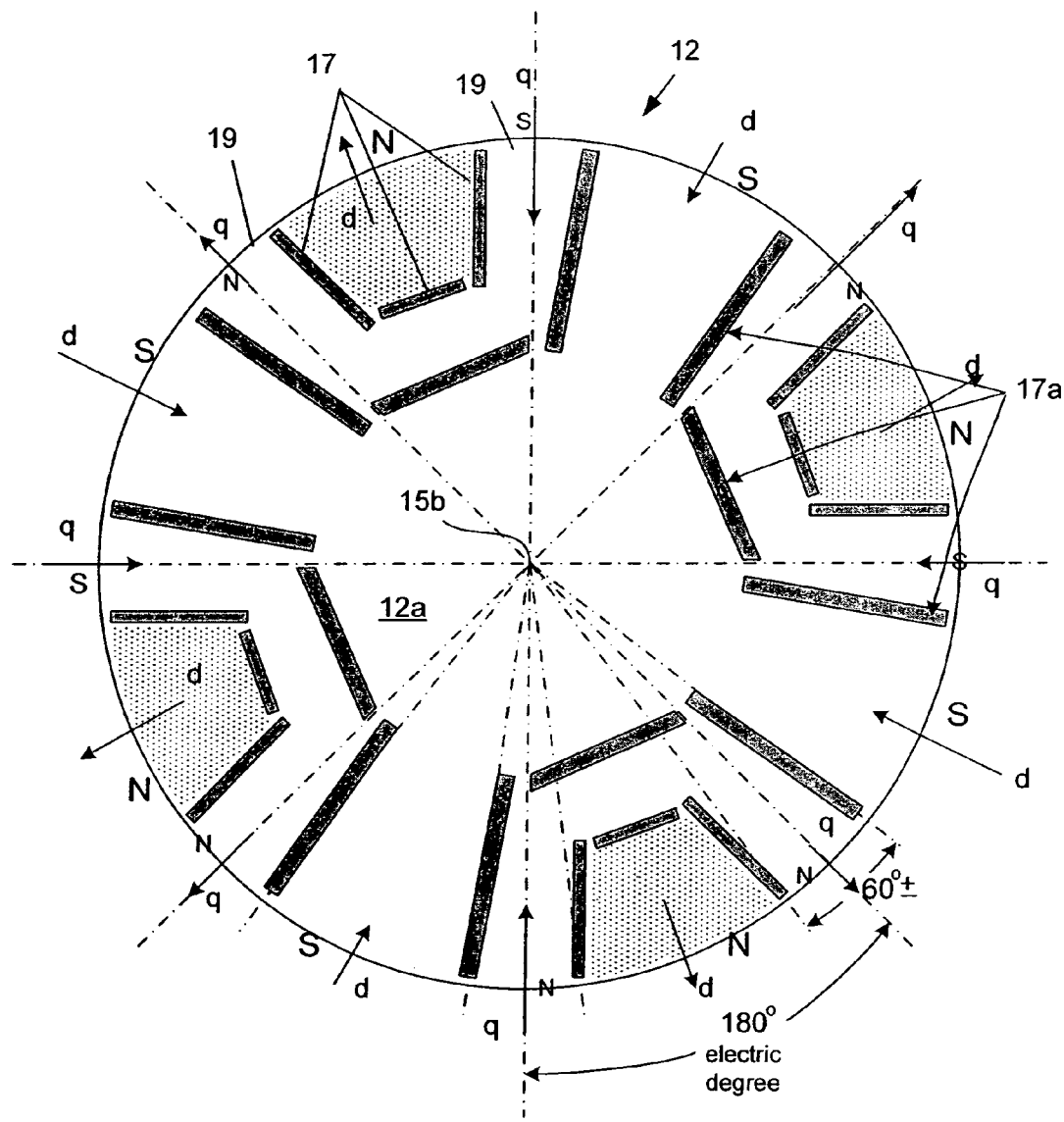
FIG. 5 shows a modification to the rotor assembly in FIGS. 1-4.

FIG. 5 shows a modification of the rotor 12 to provide a second set of PM elements 17a set deeper into the rotor 12 and parallel to the first set of PM elements 17. The spaces between the sets of PM elements 17, 17a become N polarity reluctance flux paths 19 for AC flux entering and leaving the rotor through a q-axis N pole. The d-axis reluctance flux paths are superimposed on the PM N polarity poles. The PM poles are non-identical with S pole portions having enlarged flux paths in relation to flux paths for the N pole portions, the enlarged flux paths communicating with a core 12a of the rotor 12 so as to increase torque produced by the electric machine.

Referring to FIG. 1, the rotor 11 rotates with a main drive shaft 15 around an axis of rotation 15b. The stator 11 is disposed around the rotor 12 and has a laminated core and coils as seen in a conventional AC machine. The rotor 12 is separated from the stator 17 by the radial air gap 20, which is also referred to herein as the primary air gap. AC flux is produced in this air gap 20 by the stator field. The rotor assembly 11 is separated from the DC excitation coils 23, 24 by air gaps 21 and 22, respectively. These air gaps 21, 22 are oriented axially relative to the axis 15a of the rotor 11. DC flux will be produced in these air gaps 21, 22 by the stationary DC excitation coils 23 and 24. Flux collector rings 25 are disposed between the axial air gaps 21, 22 and the DC excitation coils 23 and 24 to smooth the DC flux component and reduce the possible occurrence of eddy currents.

Figure 6A:
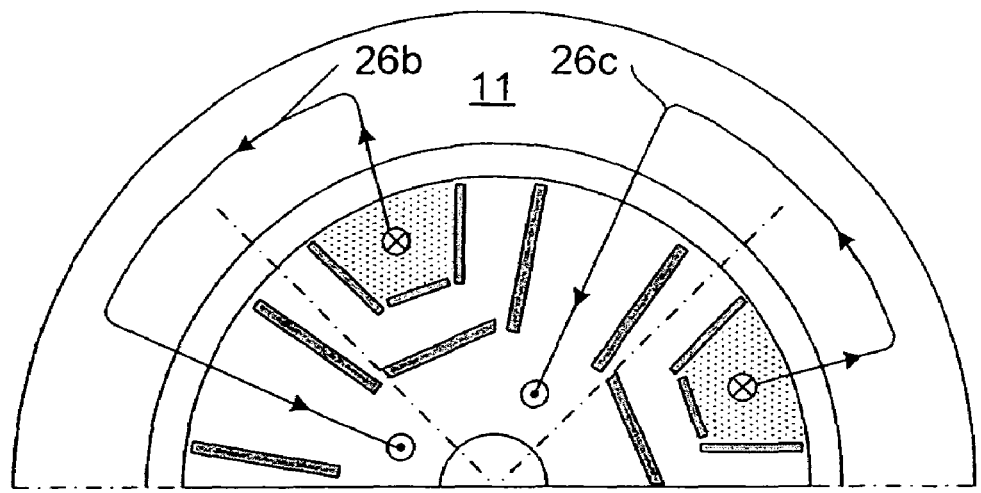
FIGS. 6a and 6b are schematic views of one alternative for utilization of excitation coils that can be used in the present invention.
Figure 6B:
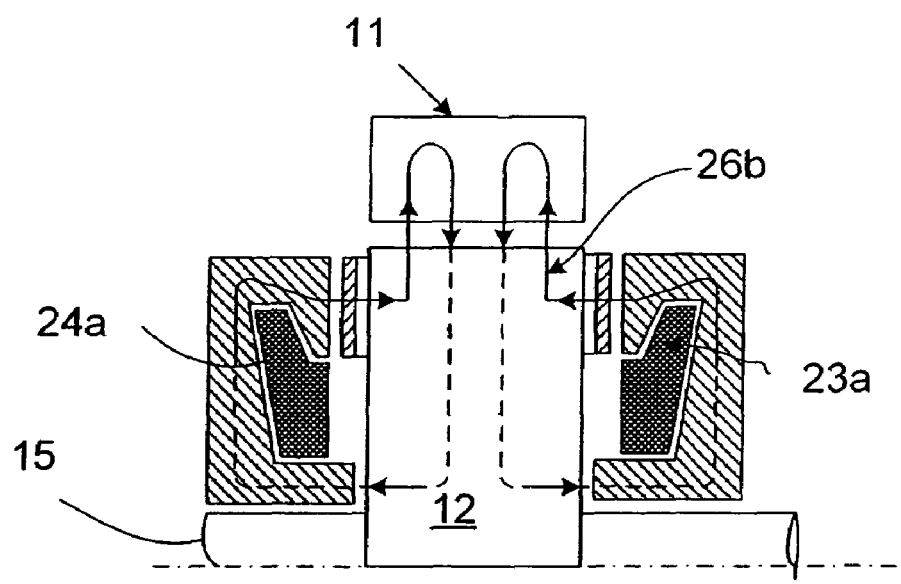
Figure 7A:
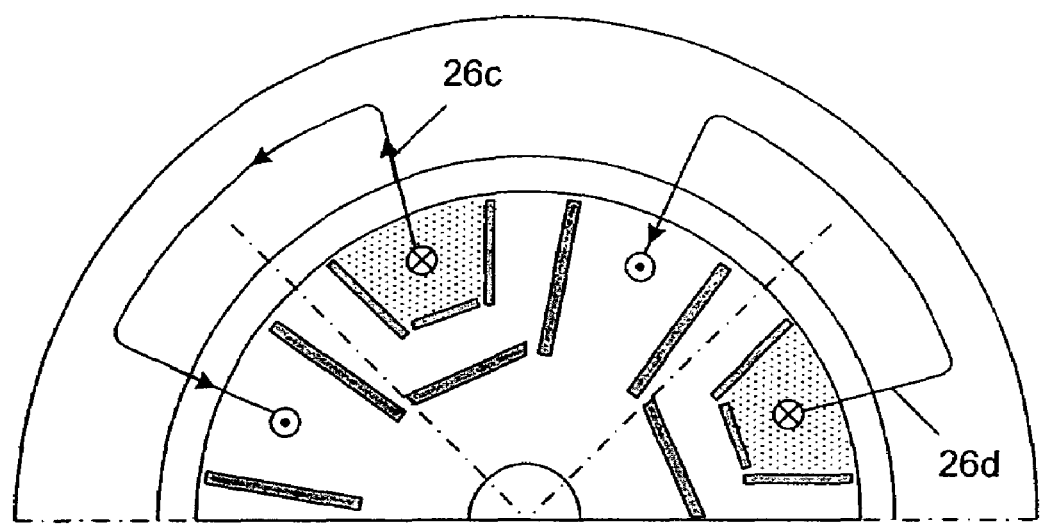
FIGS. 7a and 7b are schematic views of another alternative for utilization of excitation coils that can be used in the present invention.
Figure 7B:
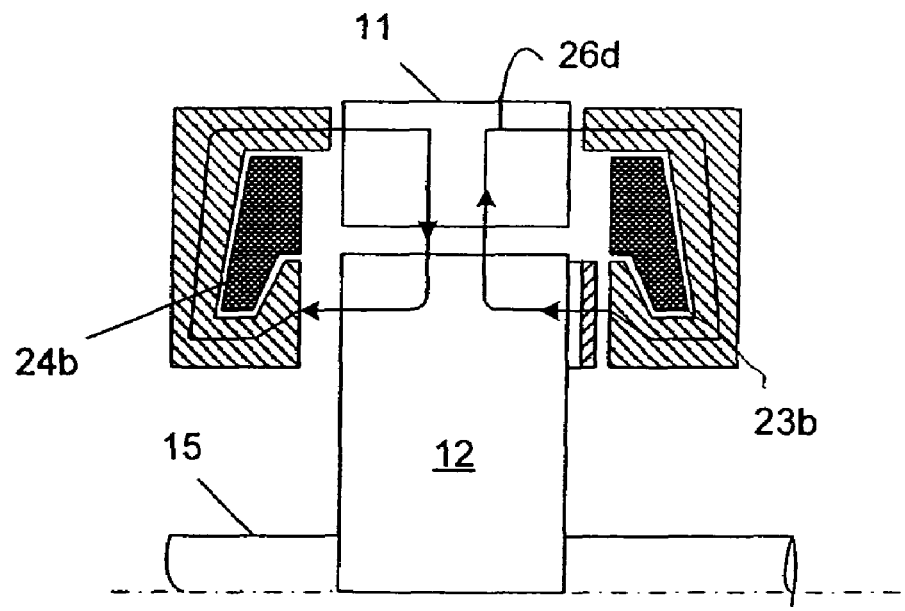

Referring to FIGS. 1, 5, 6 and 7, the DC flux 26 produced by the excitation coils 23, 24 is conducted into the rotor 11 from one set of the PM side poles of N polarity, and then turns to flow radially outward across the main air gap 20 into the stator 11, then loops and returns radially inward and is conducted axially outward through adjacent poles of S polarity at the other end of the rotor 11. The DC flux 26 produced by the excitation coils 23, 24 does not pass through the reluctance poles 19. FIG. 1 illustrates a flux path 26 and flux return path 26a for only one of the pole pairs. FIG. 6a illustrates flux paths 26b, 26c for two adjacent poles pairs. The other pole pairs would have flux paths of the same pattern. The DC flux return path 26a shown in FIG. 1 is using a return path through the motor housing 14. In that case the motor housing 24 is made of a ferromagnetic material. It is also possible to use the rotor 12 for the return path as shown in FIG. 6 as previously disclosed in U.S. Pat. No. 6,972,504, cited above. It is also possible to use the stator frame for the DC flux return path as shown in FIG. 7 by re-positioning the excitation sources 23b, 24b opposite both the stator core 11a and the rotor 12.

Referring to FIGS. 1 and 1a, the PM material 14 together with the excitation current going through the excitation coils 23 and 24 produces the north (N) and south (S) poles on the exterior of rotor 12 (FIG. 1a) that faces the stator 11 and the radial air gap 20 (FIG. 1). This rotor flux in the radial air gap 20 can be either enhanced or weakened according to the polarity of the DC excitation in the excitation assemblies 23, 24. Subsequently, the radial air gap 20 receives the rotor flux from the rotor 12, which interacts with the primary flux induced by the coils in the stator 11 to produce a torque.

Figure 2:
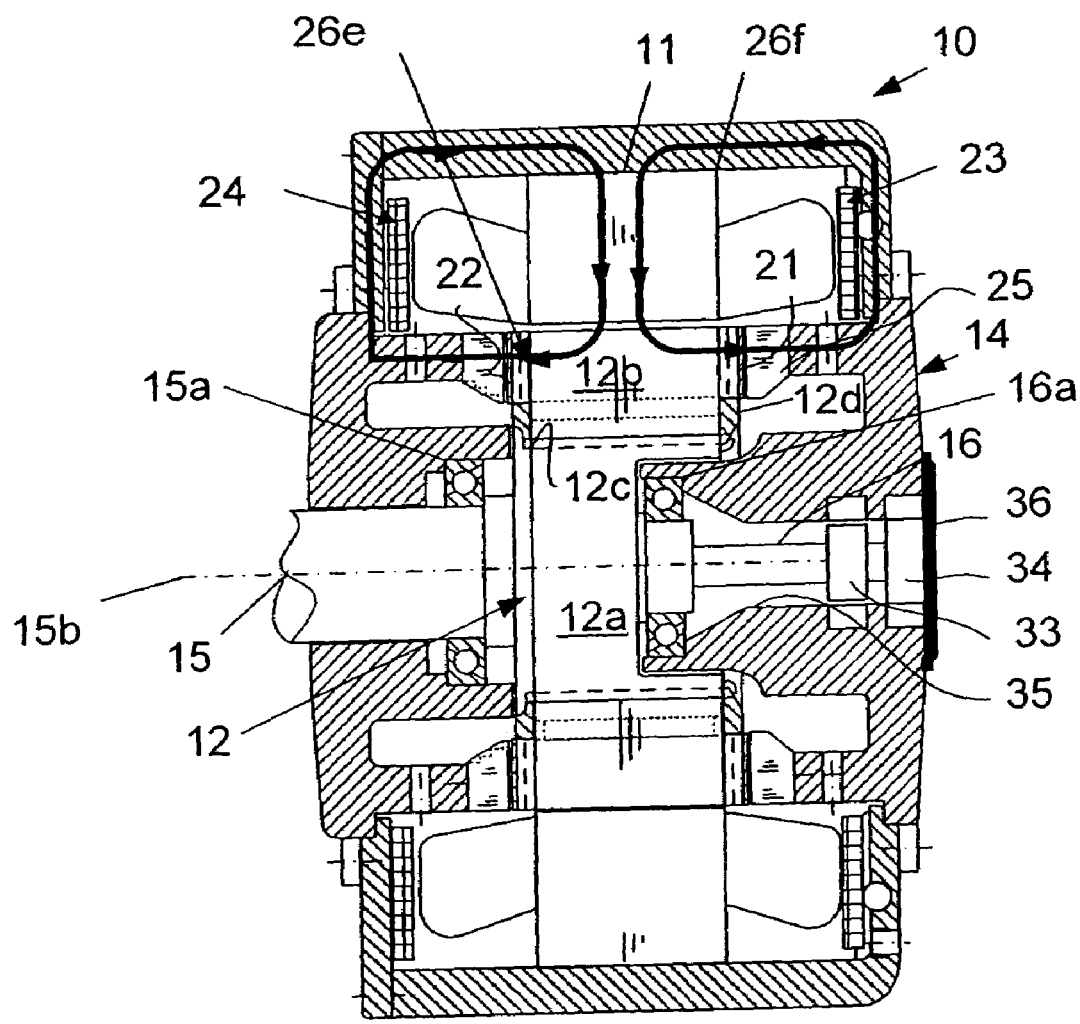
FIG. 2 is a longitudinal section view of a second embodiment of a brushless PM machine with reluctance poles.
Figure 2A:
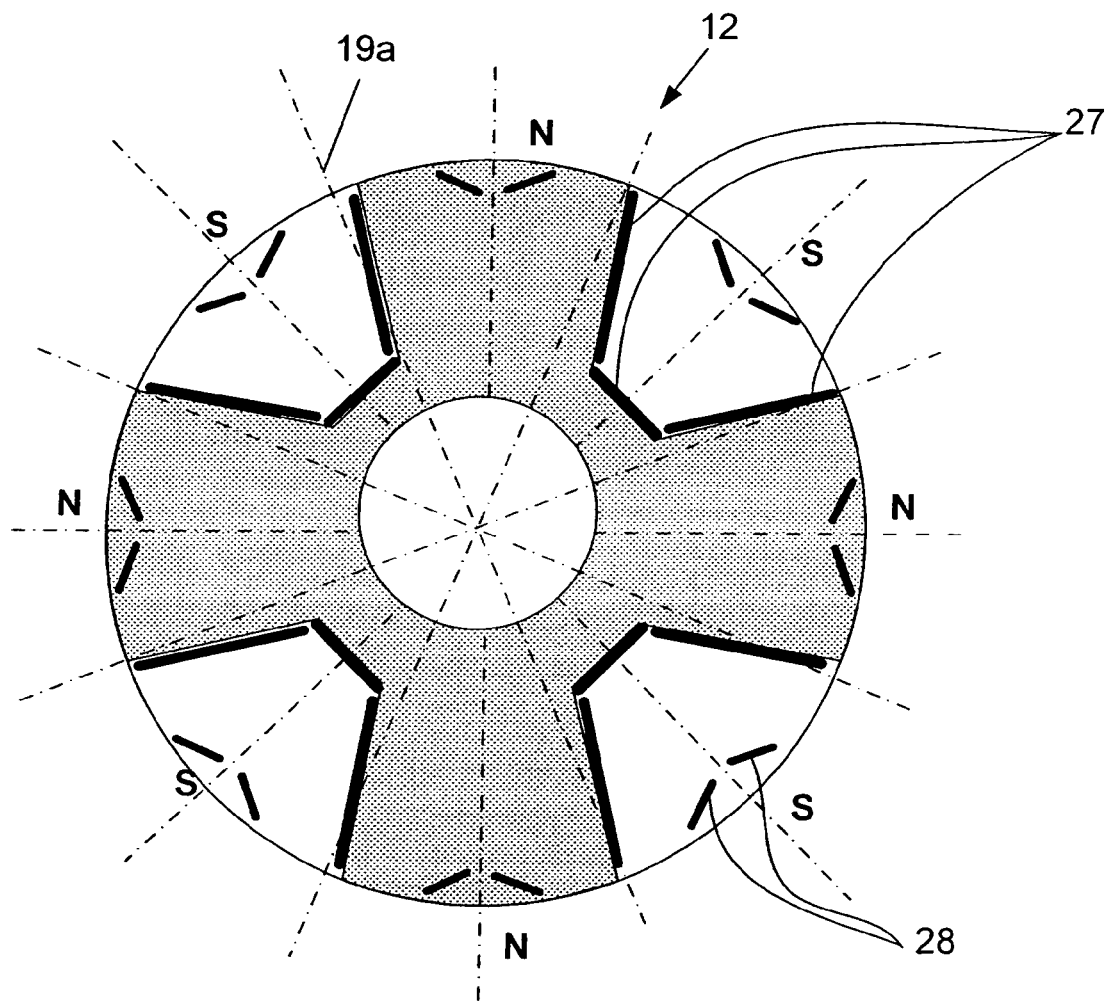
FIG. 2a is a transverse sectional view of a rotor assembly seen in FIG. 2.

FIGS. 1 and 1a illustrate an embodiment in which the first stationary excitation coil 23 and said second excitation coil 24 are electrically operated in series. Referring next to FIGS. 2 and 2a, an embodiment is illustrated in which the first stationary excitation coil 23a and the second excitation coil 24a are electrically operated in parallel to produce two DC flux paths 26e, 26f. In FIGS. 2 and 2a, parts which are the same as in FIGS. 1 and 1a have been given the same number.

In order to increase the area of the excitation coil flux axial path, FIG. 2a shows that by making every other PM pole (the N poles) without the essential portions of PM material 27 and as an asymmetrical pole, the region of the flux path can be increased. This will ease the magnetic saturation and result in more effective control of the air-gap flux by the excitation coils. The torque can be increased by introducing additional sets of auxiliary PM flux guides 28. The number of set of essential flux guides 27 is half of the total number of PM poles. The shapes of the auxiliary PM flux guides 28 can be changed from a V-shape to different patterns, such as a flat and thin rectangular shape, or even a reversed V-shape with or without PM elements inside the reversed V-shape grooves. The reluctance poles for AC flux are superimposed on the PM poles as illustrated by the reluctance poles 19a in FIG. 2a.

Figure 3:
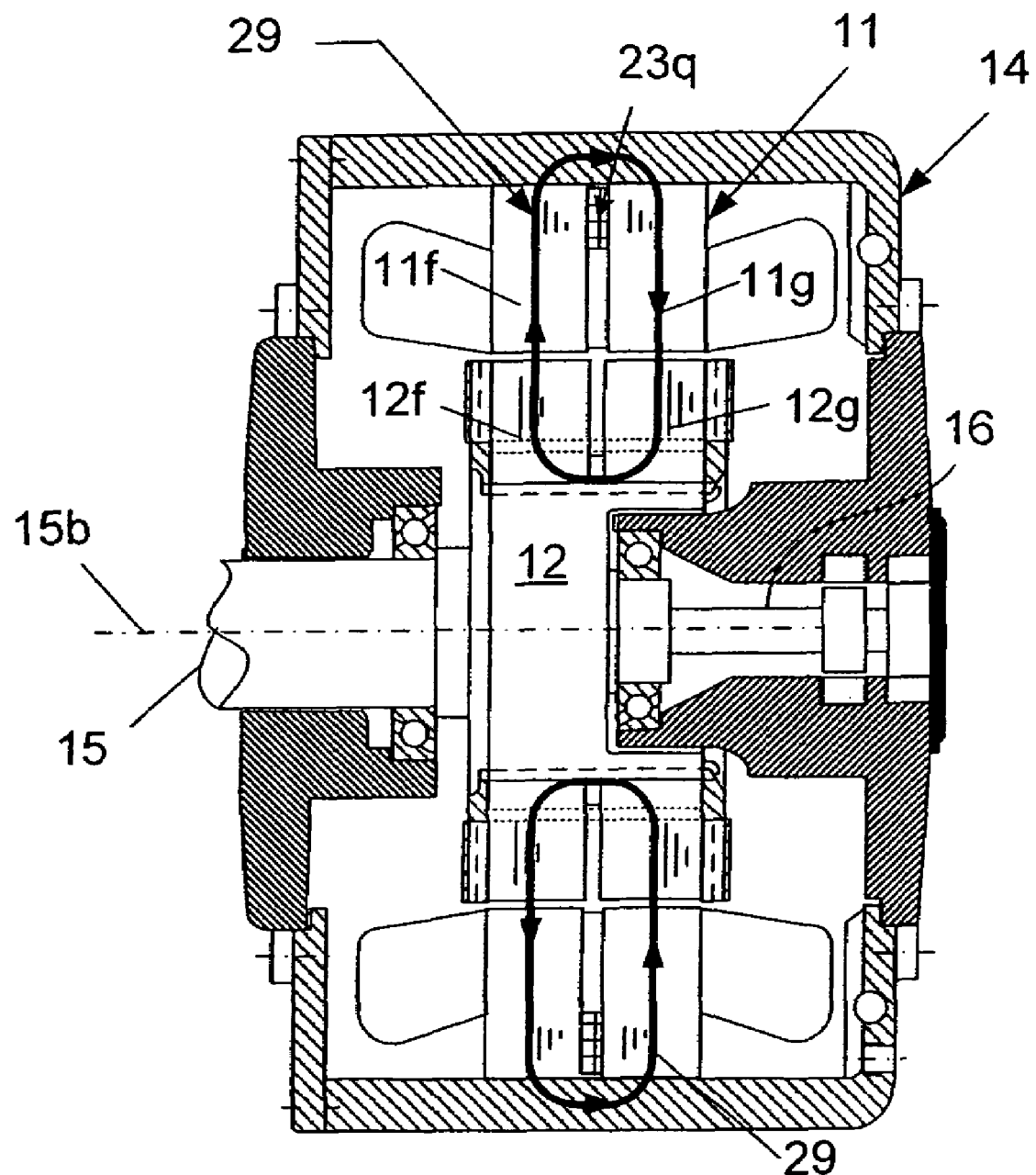
FIG. 3 is a longitudinal section view of a third embodiment of a brushless PM machine with reluctance poles.

FIG. 3 shows another option for the location of a DC excitation coil 23q. In this embodiment, the stator 11 and the rotor 12 are comprised of two laminated stacks 11f, 11g and 12f, 12g, respectively. A ring-shaped excitation coil 23q is located at the axial center of the stator 11, between two stator stacks 11f, 11g. The excitation coil flux paths 29 are shown in the FIG. 3 as they travel in a loop from one stator stack 11g, across the primary air gap 20 to a corresponding rotor stack 12g, through the central opening in the coil 23b to the other rotor stack 12f and then back across the primary air gap 20 to the other stator stack 11f and then through the motor housing 14, which is again made of a ferromagnetic material.

Figure 3A:
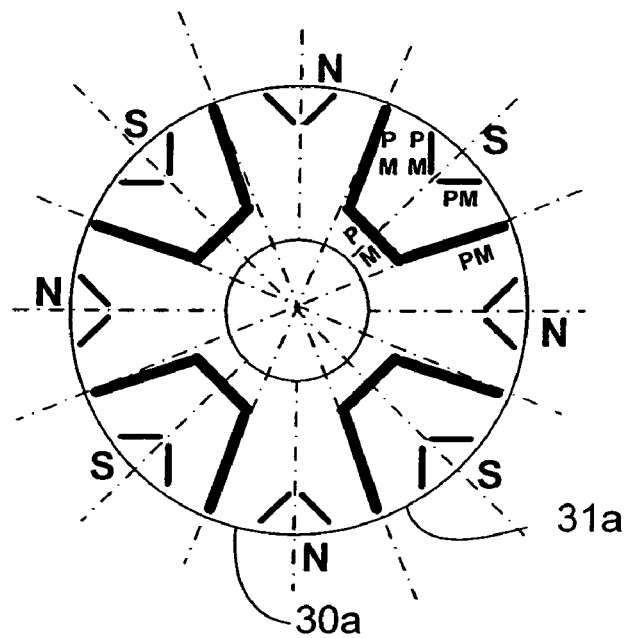
FIGS. 3a and 3b are transverse sectional views of a rotor assembly seen in FIG. 3.
Figure 3B:
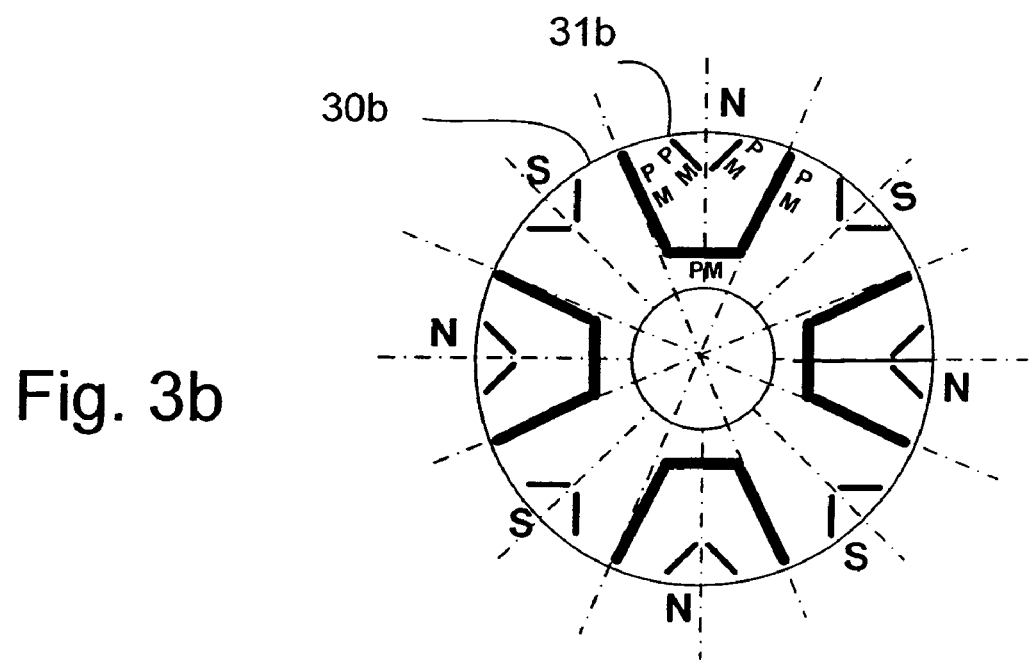

Referring to FIGS. 3a and 3b, because the excitation-coil flux directions are different in the two rotor stacks, 12f, 12g, the polarities of the PM return poles 30a, 30b (N vs. S) without the essential PM elements are arranged to be opposite of each other. The return poles 30a, 30b are non-identical to the other PM poles 31a, 31b and are enlarged to provide a greater region for the DC flux to travel as compared with the other PM poles 31a, 31b.

Figure 4:
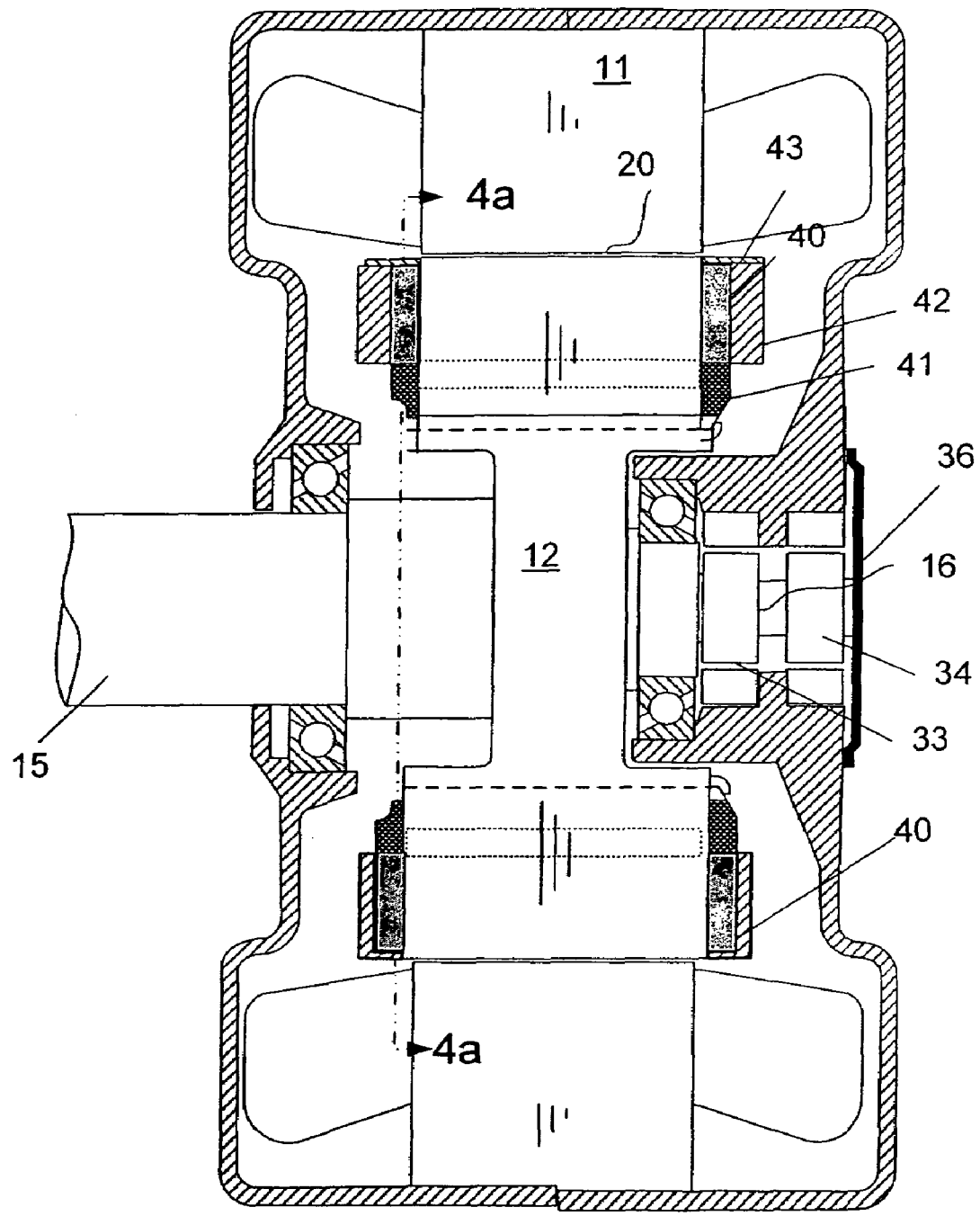
FIG. 4 is a longitudinal section view of a fourth embodiment of a brushless PM machine with reluctance poles w without field excitation coils.
Figure 4A:
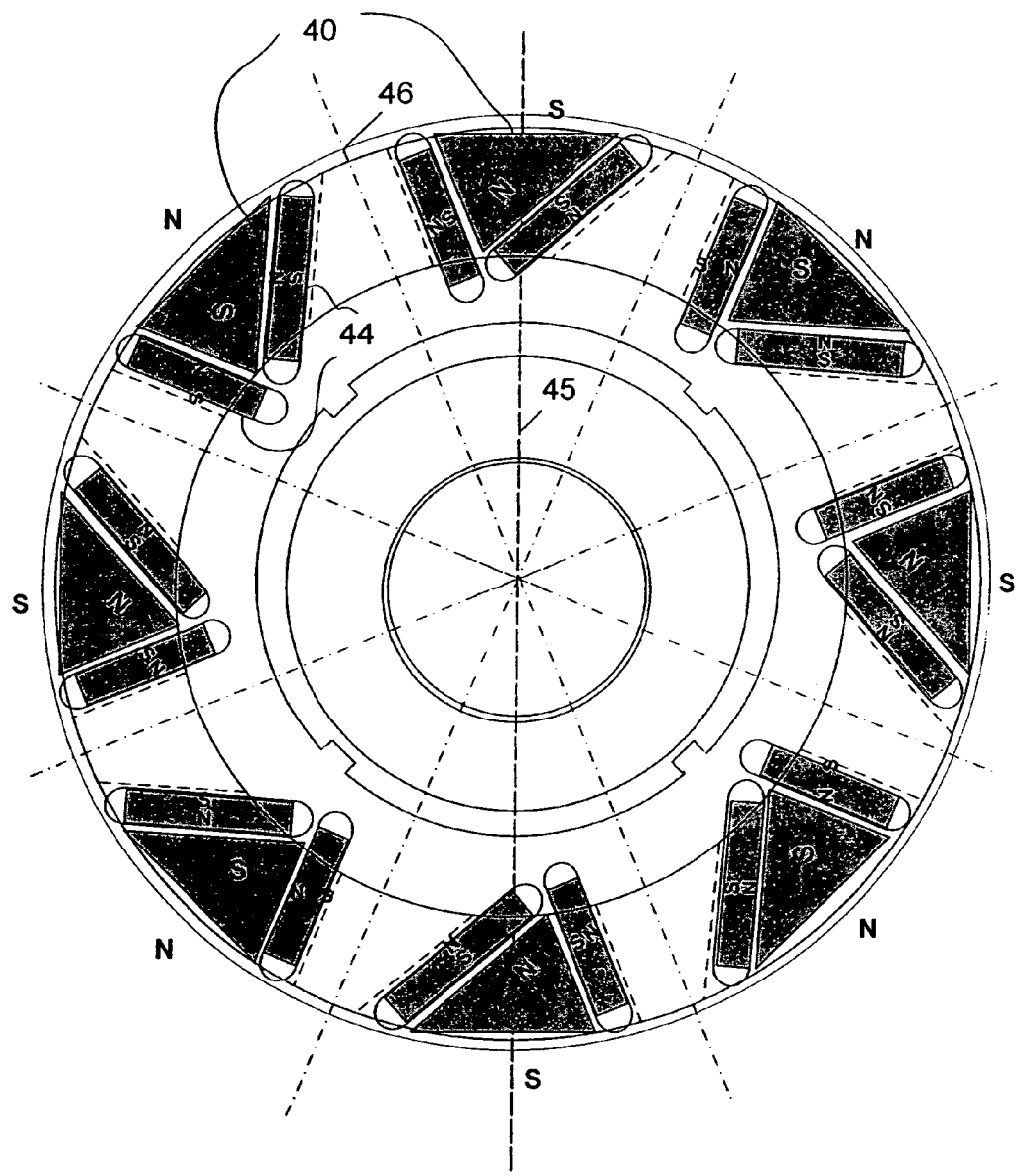
FIG. 4a is a transverse sectional view of a rotor assembly taken in a plane indicated by line 4a-4a in FIG. 4.

Referring next to FIG. 4, an embodiment is shown in which the excitation coils have been replaced by permanent magnetic (PMs) exciting elements 40 mounted on the ends of the rotor 12 to rotate with the rotor 12. These PM exciting elements 40 are held in place by a first inner diameter ring piece 41 of non-magnetic material and a ring of ferromagnetic material 42 to complete a flux path through the PM. An outer diameter ring piece 43 of non-magnetic material assists in holding the ring of ferromagnetic material in place. The rotor 12 in this embodiment has been modified so that the N and S PM poles defined by essential PM elements 44 in FIG. 4a are asymmetrical in relation to a radial axis 45 through a center of the N and S PM poles.

The asymmetrical air gap of a pole and the asymmetrical interior PM locations increases reluctance torque. The asymmetrical PM elements 40 make more room for the q-axis flux to flow in the rotor lamination, which results in less q-axis magnetic saturation. This asymmetrical-pole technology can be used for the interior-permanent-magnet-reluctance motors with or without field excitation.

Figure 8:
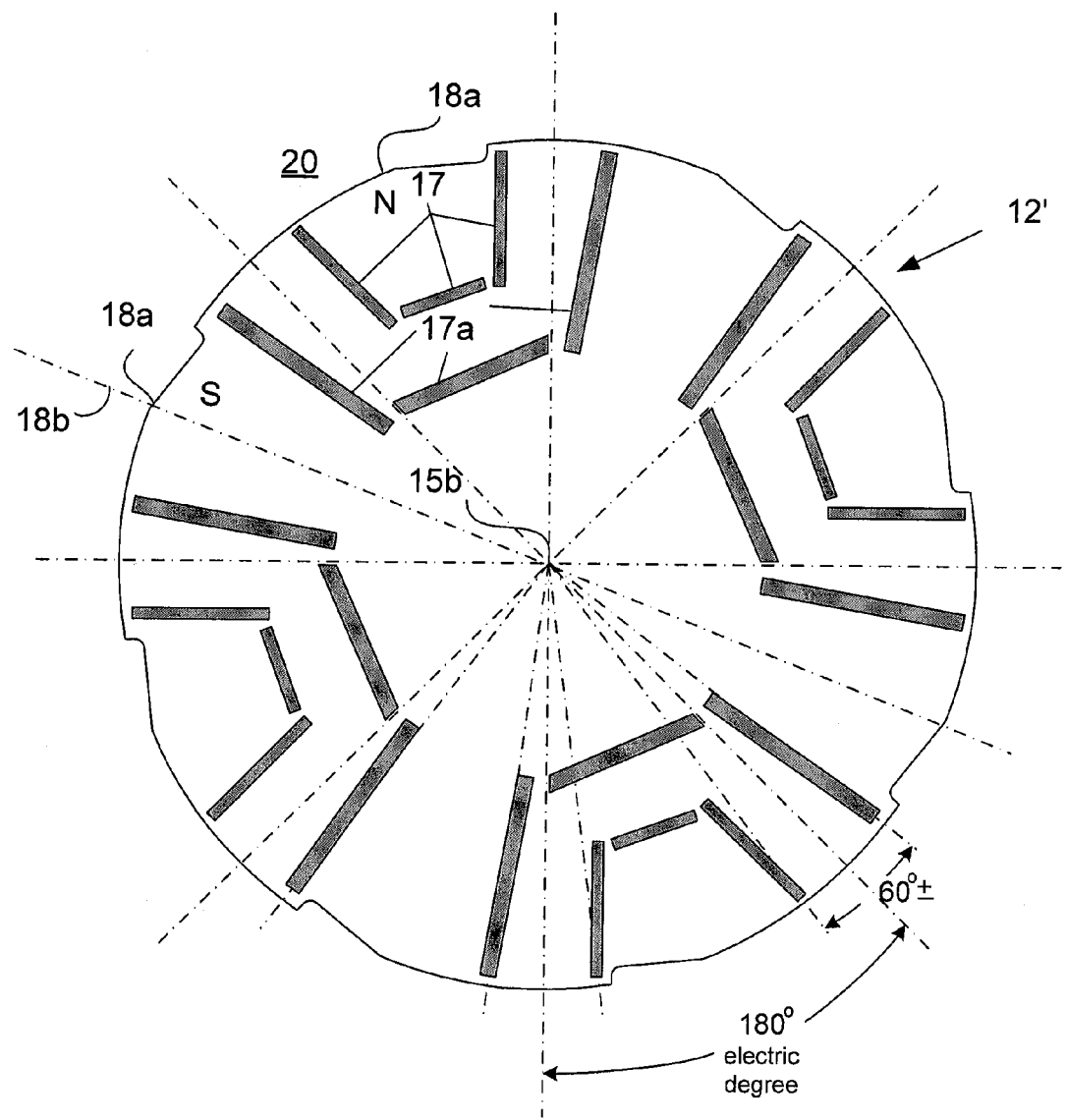
FIGS. 8-12 show modifications to the rotor assembly of FIGS. 1 to 4 to vary the radial air gap.

FIG. 8 shows a modified rotor 12' in which the d-axis reluctance pole faces 18a facing the primary air gap 20 each have a groove of varying depth formed in the pole face 18a, and this groove is asymmetrical in shape and in position and this results in the pole face 18a being asymmetrical in shape in relation to a radial axis of symmetry 18b from an axis of rotation 15b for the rotor 12' to cause a thickness of the primary air gap 20 to vary across the PM and d-axis reluctance pole faces 18a. This increases the air gap asymmetrically across the d-axis pole faces 18a. This further enhances the forward rotation torque but will reduce the backward rotation torque. The difference between the forward and backward torque difference can be controlled through design.

Figure 9:
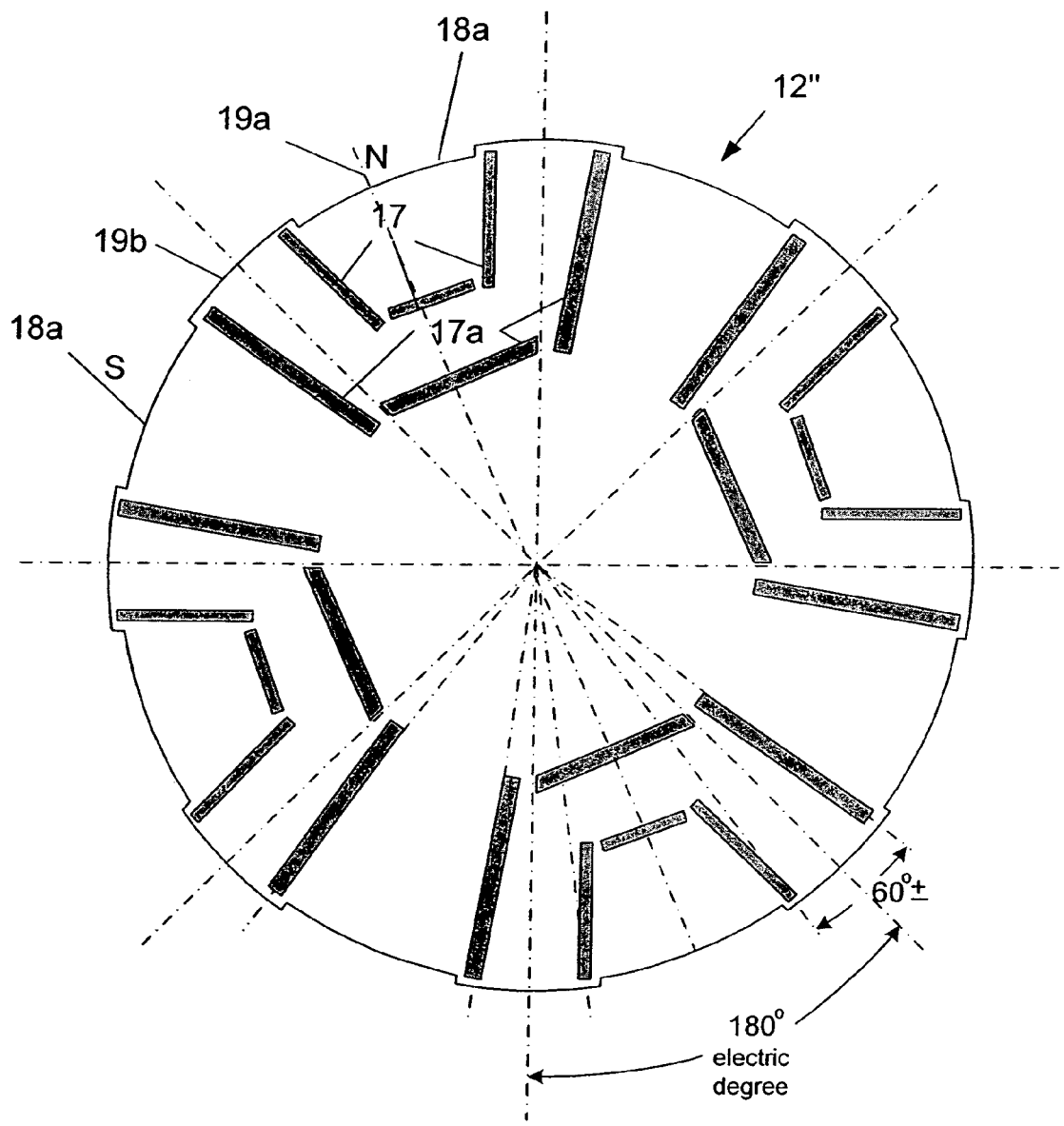

FIG. 9 shows a modification of the rotor in which the PM pole faces 19b facing the primary air gap are depressed relative to the pole faces 19a for the reluctance poles 19 causing a thickness of the primary air gap to vary across the PM pole faces and the reluctance pole faces.

Figure 10:
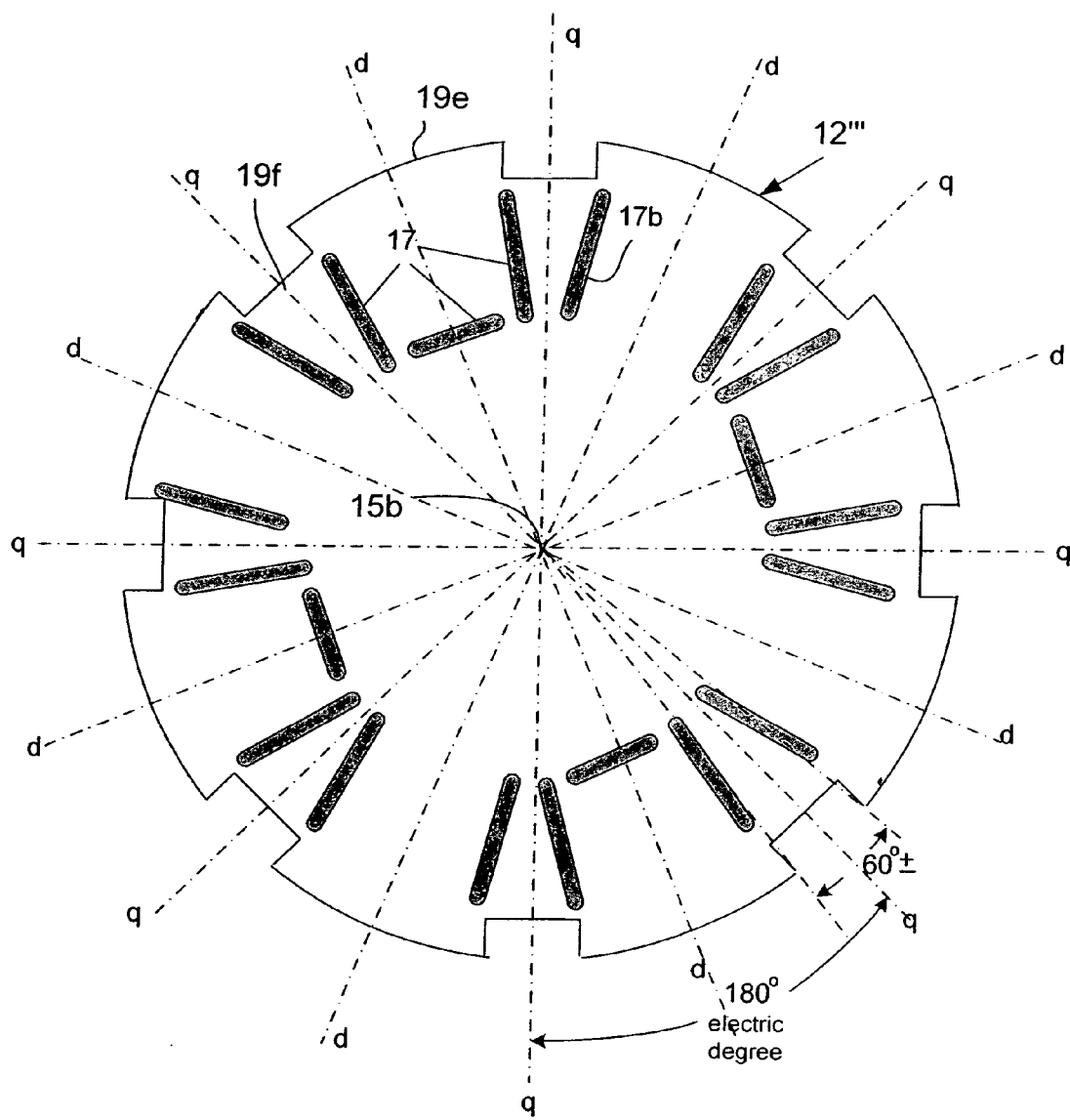

FIG. 10 shows a modified rotor 12''' in which the d-axis reluctance pole faces 19e facing the primary air gap 20 project further into the primary air gap 20 and the pole faces 19f for the q-axis reluctance poles are recessed relative to the d-axis reluctance pole faces 19e causing a thickness of the primary air gap to vary across the reluctance pole faces. FIG. 10 also shows PM elements 17b defining the q-axis reluctance poles as being disposed along radiuses parallel to side pieces 17 for the d-axis poles to provide q-axis poles of different sized flux conduction regions than for the d-axis reluctance poles.

Figure 11:
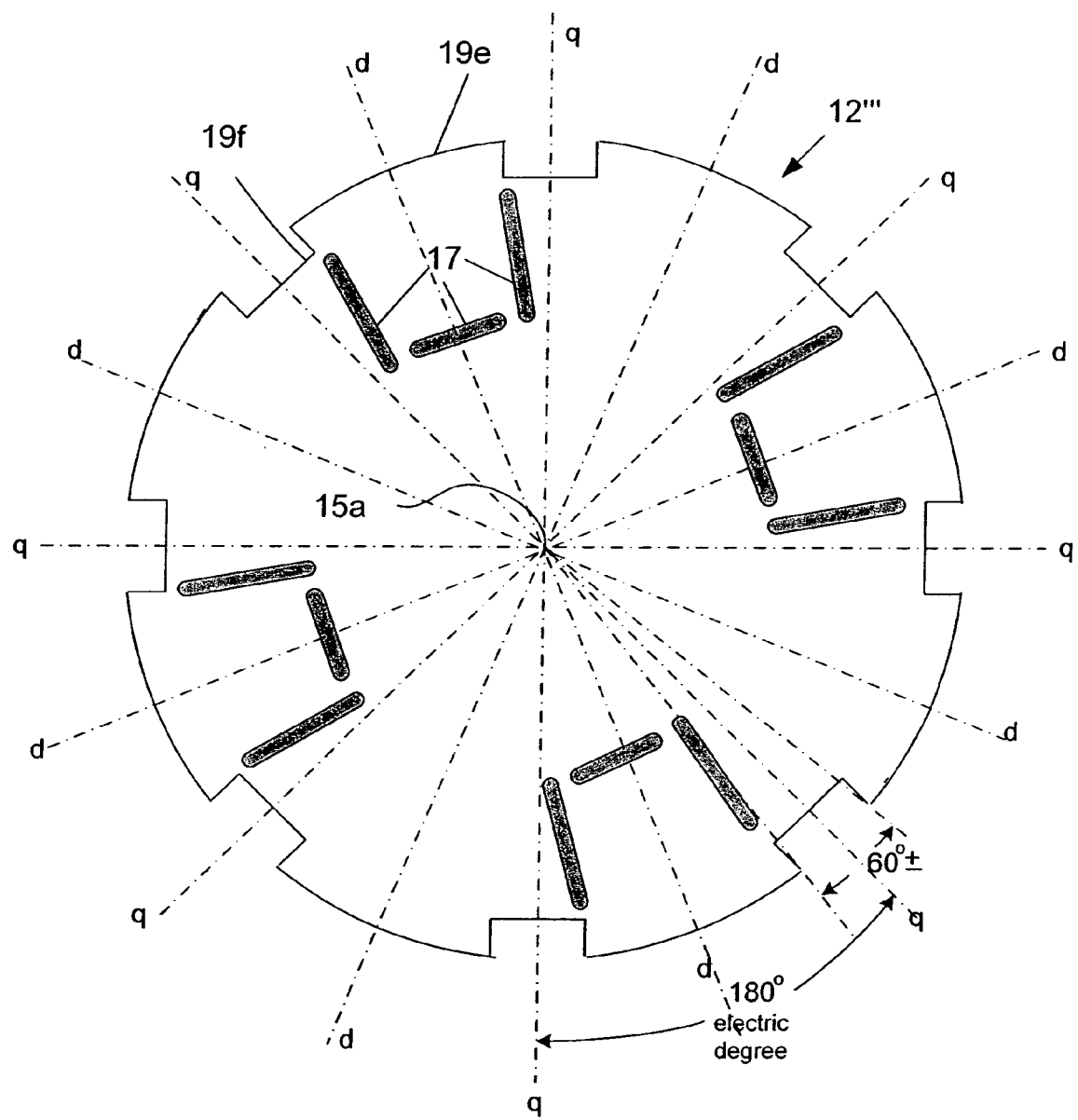

FIG. 11 shows a modification of FIG. 10 in which the q-axis defining PM elements in FIG. 10 have been eliminated while retaining the difference in radius between the d-axis reluctance pole faces 19e and q-axis reluctance pole faces 19f.

Figure 12:
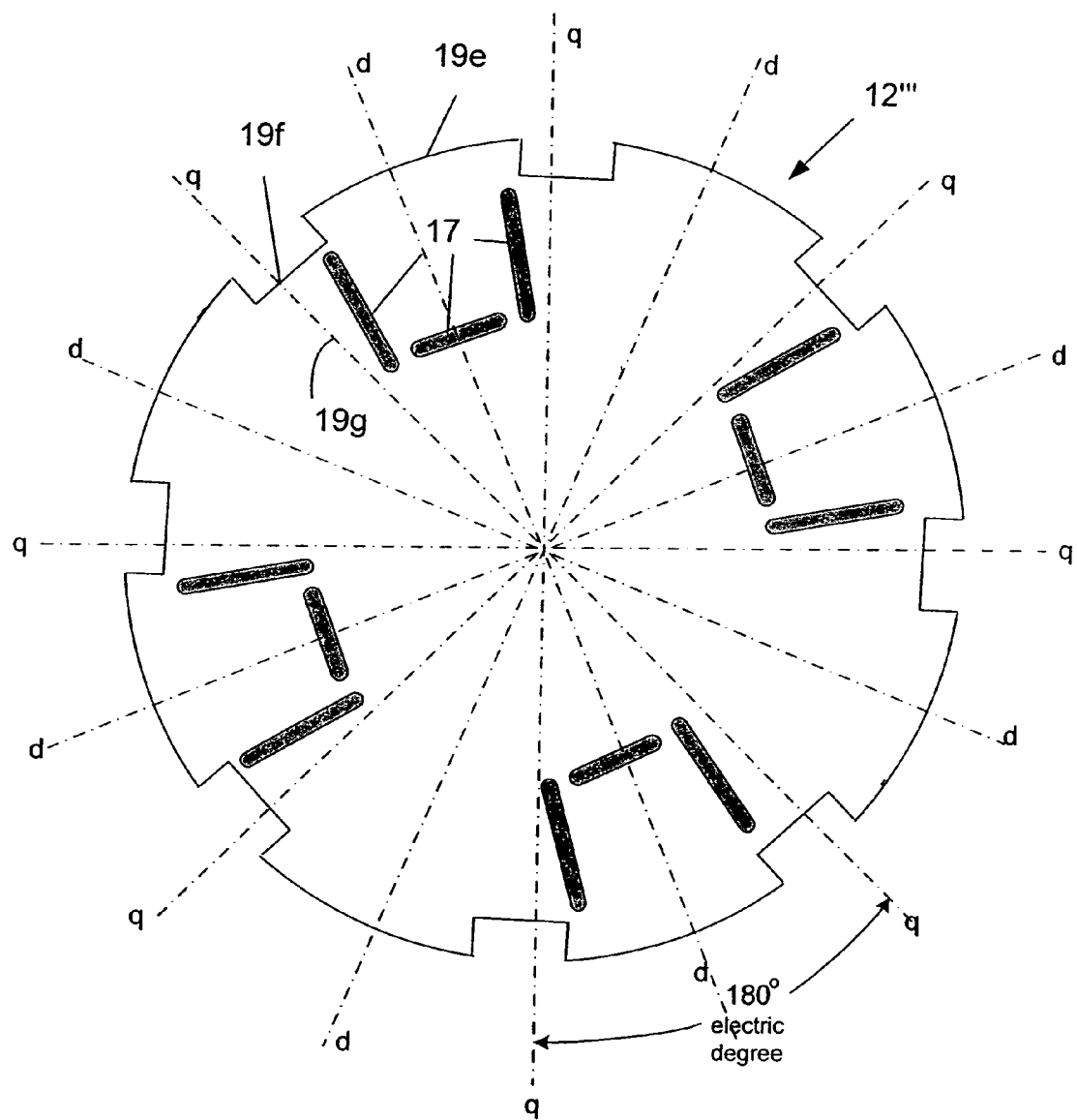

FIG. 12 shows that the depressed or recessed reluctance pole faces 19f for the q-axis can be disposed asymmetrically relative to a radial axis of symmetry 19g for each q-axis pole while retaining the difference in radius between the d-axis reluctance pole faces 19e and q-axis reluctance pole faces 19f.

Figure 13:
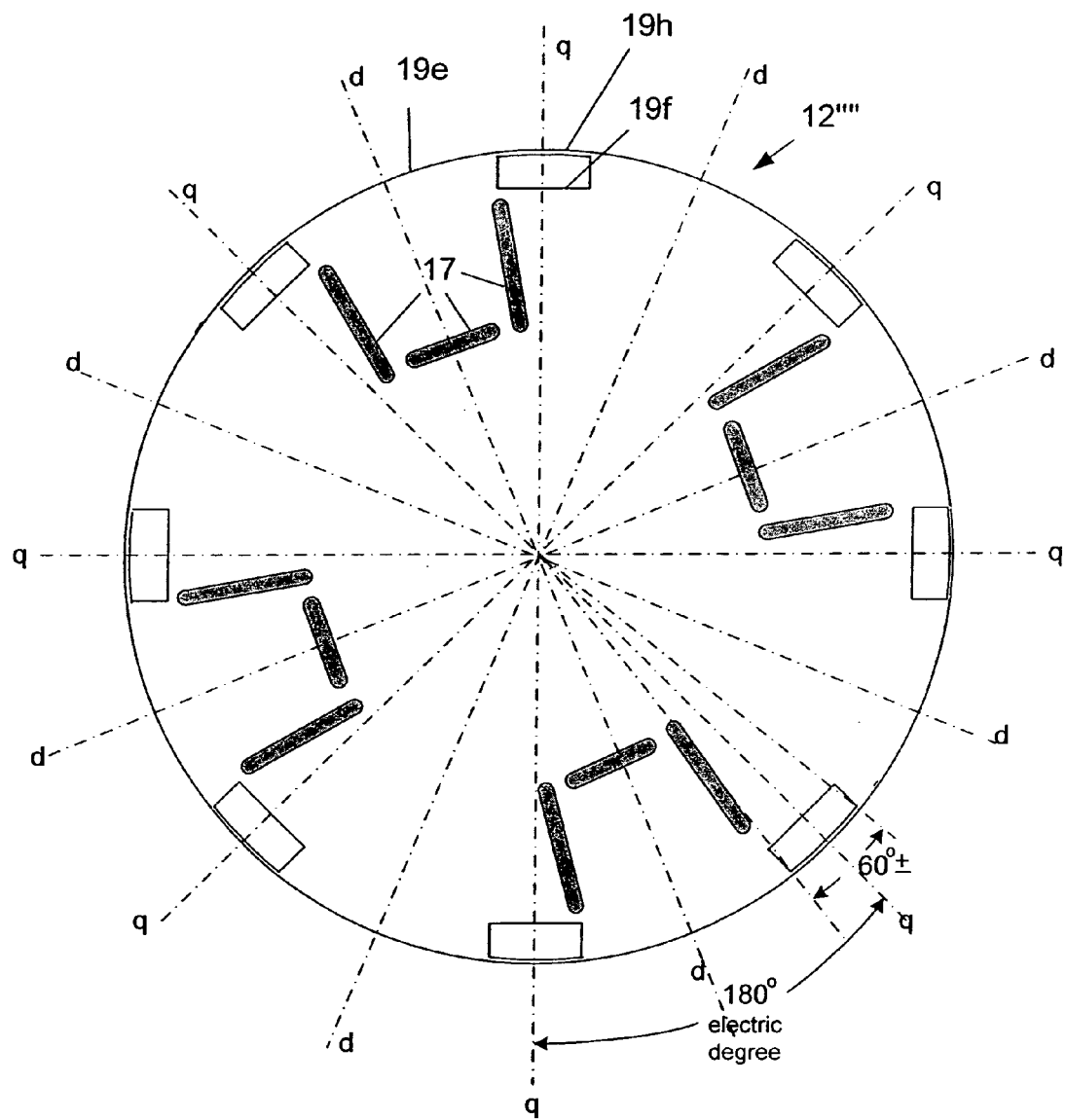
FIG. 13 shows a modification to the rotor assembly to improve performance while maintaining a uniform air gap.

FIG. 13 shows a modification to FIG. 11 in which a thin bridge 19h is provided over the q-axis poles faces 19f of FIG. 11. This reduces the rotor surface variation for noise and hydraulic friction reasons.

The invention has been disclosed in terms of a motor which can be an AC synchronous motor or a DC brushless motor according to the type of control as known in the art. The invention is applicable to both motors and generators.

This has been a description of the preferred embodiments of the invention. The present invention is intended to encompass additional embodiments including modifications to the details described above which would nevertheless come within the scope of the following claims.

I claim:

1. A brushless electric machine comprising:
   a stator;
   a rotor having an axis of rotation, the rotor being spaced from the stator to define a primary air gap that receives an AC flux from the stator, the rotor having PM pole portions alternating in polarity around a circumference of the rotor;
   at least a first source of field excitation flux positioned across at least one of the primary air gap or a secondary air gap from the rotor so as to induce a DC flux in the rotor which increases a resulting flux in the primary air gap; and
   wherein portions of PM material are positioned to form boundaries that separate PM pole portions of alternating north polarity and south polarity that are spaced apart around a circumference of the rotor, for conveying the DC flux to or from the primary air gap and for inhibiting flux from leaking from said pole portions prior to reaching the primary air gap;
   further comprising reluctance poles of ferromagnetic material that are positioned in spaces between the PM pole portions of alternating north polarity and south polarity, to produce reluctance torque in the rotor in response to AC flux in the primary air gap;
   wherein said PM pole portions further comprise pole portions of one polarity having enlarged flux paths in relation to flux paths for pole portions of an opposite polarity, said enlarged flux paths communicating with a core of the rotor so as to increase torque produced by the electric machine; and wherein at least one source of field excitation is positioned across a secondary air gap from the rotor so as to induce a DC flux in the rotor in an axial direction and then through the PM pole portions to the primary air gap which increases a resulting flux in the primary air gap when said direct current is of a first polarity and which reduces the resulting flux in the primary air gap when said direct current is of a second polarity opposite said first polarity.

2. The brushless electric machine of claim 1, wherein the source of field excitation comprises at least a first stationary excitation coil for receiving direct current from an external source.

3. The brushless electric machine of claim 2, further comprising:
   a second stationary excitation coil for receiving direct current from an external source and being positioned across a second secondary air gap on an opposite side of the rotor from the first-mentioned secondary air gap.

4. The brushless machine of claim 1, wherein said rotor has a body portion that is cylindrical except for longitudinally extending grooves, wherein first portions of PM material are disposed in said grooves, and wherein PM pole portions are disposed in said grooves over the first portions of PM material, to form a cylindrical rotor with PM pole portions of alternating polarity on a rotor circumference that are separated by PM material.

5. The brushless machine of claim 1, wherein PM pole portions form a plurality of q-axis reluctance pole faces facing the primary air gap alternating with a plurality of d-axis reluctance pole faces facing the primary air gap, said q-axis reluctance poles faces being symmetrical and said d-axis pole faces each being asymmetrical in radial extent in relation to a corresponding radial axis of symmetry from an axis of rotation for the rotor, said pole faces causing a width of the primary air gap to vary across the pole faces as the rotor is rotated.

6. The brushless machine of claim 1, wherein the machine is a brushless AC synchronous machine.

7. The brushless machine of claim 1, wherein the machine is a brushless DC machine.

8. The brushless machine of claim 1, wherein the machine is a motor.

9. A method of controlling flux in a brushless electrical machine, the method comprising:
   inducing an AC flux in a rotor from a stator across a primary air gap by conducting a current in a primary excitation winding on the stator;
   positioning a source of secondary excitation opposite one portion of the rotor to produce an axial DC flux that passes through a core of the rotor and produces a resultant flux in a primary air gap resulting from the AC flux and the DC flux;
   providing portions of PM material in a rotor as boundaries separating PM pole portions of opposite polarity in the rotor from each other to define PM pole portions of opposite polarity for conveying the DC flux to or from the primary air gap; and
   wherein said PM pole portions further comprise pole portions of one polarity having enlarged flux paths in relation to flux paths for pole portions of an opposite polarity, said enlarged flux paths communicating with a core of the rotor so as to increase torque produced by the electric machine;
   spacing the portions of PM material around a circumference of the rotor so as to separate q-axis reluctance poles of ferromagnetic material from the PM pole portions, said q-axis reluctance poles interacting with the AC flux in the primary air gap.

10. The method of claim 9, wherein the PM pole portions form a plurality of identical d-axis reluctance pole faces facing the primary air gap, and the method further comprising varying a radial distance of the d-axis reluctance pole faces across the primary air gap from the stator, while maintaining a radial distance of the q-axis reluctance pole faces across the air gap, the d-axis reluctance pole faces being asymmetrical in relation to a radial axis of symmetry from an axis of rotation for the rotor.

11. The method of claim 9, wherein the machine is operated as a brushless AC synchronous machine.

12. The method of claim 9, wherein the machine is operated as a brushless DC machine.

13. The method of claim 9, wherein the machine is operated as a motor.

14. The method of claim 9, wherein the source of secondary excitation is stationary and is spaced from at least one end of the rotor to produce a DC flux in the rotor and to produce a resultant flux in a primary air gap resulting from the AC flux and the DC flux.

15. The brushless electric machine of claim 1, wherein the portions of PM material include first and second portions of PM material positioned in spaced apart and parallel relationship; and
   wherein the q-axis reluctance poles are each disposed between first and second portions of PM material that direct the q-axis flux from one reluctance pole face to another reluctance pole face on a surface of the rotor and away from the core of the rotor.

16. The method of claim 9, wherein the portions of PM material include first and second portions of PM material positioned in spaced apart and parallel relationship;
   wherein the q-axis reluctance poles are each disposed between first and second portions of PM material that direct the q-axis flux from one reluctance pole face to another reluctance pole face on a surface of the rotor and away from the core of the rotor.

* * * * *